Feb. 16, 1960             E. R. LANG             2,925,544
MECHANICALLY REBALANCED SERVOMOTOR SYSTEM
Filed Jan. 8, 1957
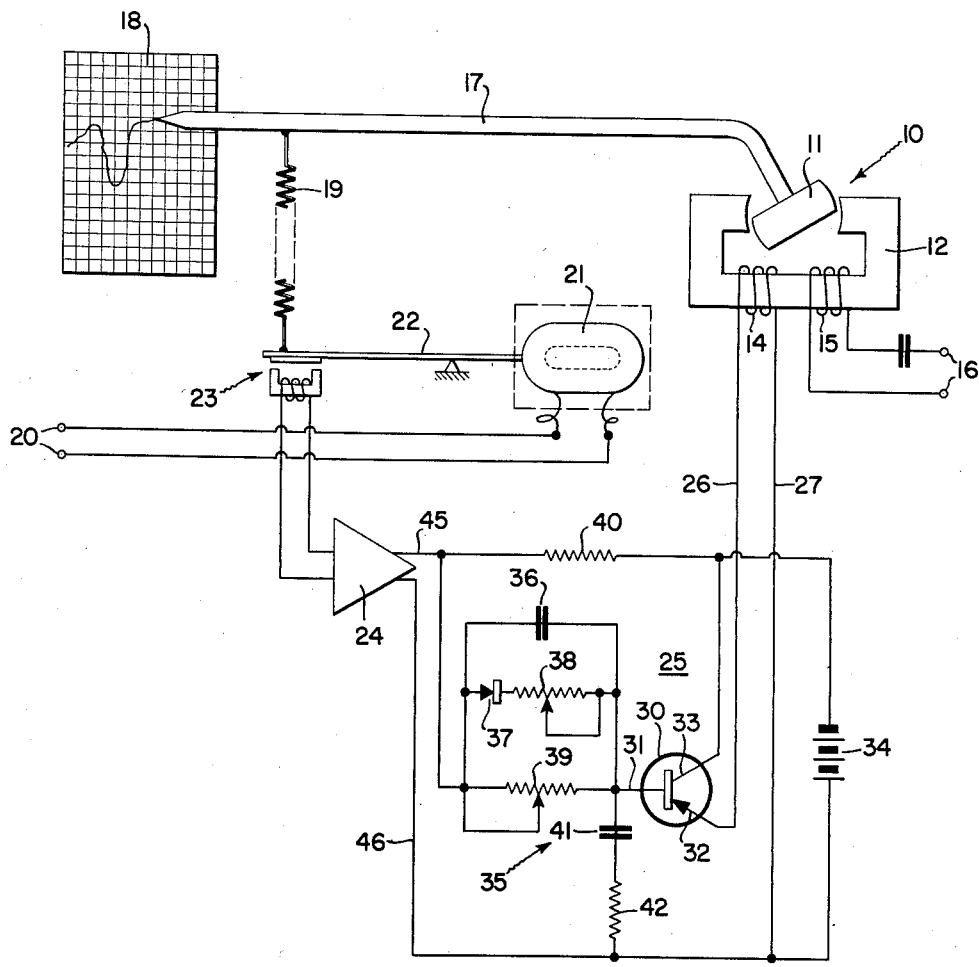
INVENTOR.
ELLIOT R. LANG
BY
*Arthur H. Swanson*
ATTORNEY.

United States Patent Office 2,925,544
Patented Feb. 16, 1960

2,925,544

MECHANICALLY REBALANCED SERVOMOTOR SYSTEM

Elliot R. Lang, Pennsauken, N.J., assignor to Minneapolis-Honeywell Regulator Company, Minneapolis, Minn., a corporation of Delaware Application January 8, 1957, Serial No. 633,003

11 Claims. (Cl. 318—28)

A general object of the present invention is to provide a new and improved apparatus for converting a variable electrical signal into a proportional output motion. More specifically, the invention is concerned with apparatus operable to drive a torque motor and characterized by its stability and its ability to effect constant speed operation of the controlled torque motor as it is operated in either direction.

Torque motors have been used in electrical signal indicators to position an indicating arm which may cooperate with a suitable indicator scale or move a pen over a recorder chart. The form of the indicator positioning mechanism incorporated in the present invention comprises an electrical input force coil which is adapted to deflect a movable member in accordance with the applied input to the coil. The motion of the member is electrically detected and a power drive circuit is controlled thereby. The power drive circuit is in turn connected to variably energize the drive coil of an associated torque motor which carries the indicator arm. In the preferred form of the invention, a spring is coupled between the indicator arm and the aforementioned movable member so as to force balance the force applied to that member by the input force coil. This spring may also serve as a return spring to drive the indicator arm in a direction opposite that in which it is driven by the energization of the drive coil. This basic apparatus is a closed loop type of servo mechanism and consequently may be subject to instability due to lags in the electrical circuit and the torque motor if these lags are allowed to come into play. Generally, these lags are quite small and may readily be damped out by the use of an electrical damping circuit which introduces sufficient lag into the control loop to effectively swamp out any other system lags. This will insure stability of the overall system.

It has been found that the current amplifying characteristics of a transistor are particularly adapted for use with direct current torque motors. However, when the transistor is placed in a servo loop of the present type wherein a damping element is included, the non-linearity of the transistor may be effective to cause the torque motor, and thereby the indicator arm, to move faster in one direction than the other. Such operation is undesirable and may be eliminated by introducing a non-linear damping circuit into the drive circuit for the torque motor, as is accomplished by the present invention.

It is therefore a more specific object of the present invention to provide a new and improved torque motor drive circuit incorporating a non-linear damping circuit which will be effective to cause the rate of motion of the torque motor output to be the same regardless of the direction of the torque motor rotation.

Still another more specific object of the present invention is to provide a new and improved torque motor drive circuit incorporating a transistor as a torque motor driving element with a non-linear damping circuit connected to the input of the transistor so that the torque motor output will be of the same speed regardless of the direction in which the motor is operating.

Still another more specific object of the present invention is to incorporate in combination with a torque motor drive circuit a non-linear damping circuit including a diode whose impedance in one direction is larger than it is in the opposite direction to achieve a non-linear damping action in the driving of the torque motor.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

The single figure of the drawings shows one form of my invention.

Referring to the single figure, the numeral 10 represents a torque motor of the direct current type having an armature 11 and a core structure 12, the latter of which has wound thereon a drive coil 14 and a further coil 15, the latter of which is used to supply a dither signal, or friction and hysterisis reducing signal, to the torque motor in accordance with the applied alternating current applied to input terminals 16. The torque motor 10, as shown, may also be referred to as a rotary solenoid D.C. motor. The armature 11 is connected to an indicator arm 17, the latter of which may carry at its opposite end a recording pen movable over a chart 18.

The input signal for effecting a proportional positioning of the indicator arm 17 is applied to the input terminals 20, the latter of which are connected to a suitable force coil 21. The force coil is an electrical coil of planar construction which is adapted to move in accordance with the reaction between the input electrical signal on the coil and a magnetic field of a permanent magnet, not shown, to create an output force on a pivoted member 22.

A motion detector 23, of the electrical type, is associated with the other end of the member 22 and is adapted to vary an electrical parameter of an oscillator-amplifier 24. An oscillator-amplifier of the type suitable for use in this instance is shown and described in the co-pending application of William J. Popowsky, Serial No. 442,264, filed January 9, 1954, now Patent No. 2,847,625. Particular reference is made to Fig. 5 of that application. The circuit comprises a transistor oscillator in which the variable impedance element 23 of the instant application controls the load on the oscillatory circuit. The output of this circuit is taken in the D.C. supply portion and constitutes a D.C. signal output which varies in accordance with the impedance of the element 23; i.e., the relative positioning of the two magnetic portions thereof. The output of the oscillator-amplifier 24 is, therefore, a direct current signal and is coupled into a power amplifier stage 25, the latter of which has its output leads 26 and 27 coupled to supply current to the drive coil 14.

The power amplifier circuit 25 includes a transistor 30 having a base electrode 31, an emitter electrode 32, and a collector electrode 33. A battery 34 is connected to supply power for the output stage. The input to the transistor 30 includes a non-linear damping circuit 35. This circuit comprises a condenser 36 and a diode 37, the later of which is connected in series with a variable resistor 38. The last named series connection is connected in parallel with the condenser 36. A further variable resistor 39 is connected in parallel with the condenser 36. A load resistor 40, for the oscillator-amplifier 24, is connected between the power supply 34 and the damping circuit 35. Also included in the damping circuit 35 are the condenser 41 and a resistor 42, connected in series in the base circuit of the transistor 30.

In considering the operation of the apparatus disclosed in the drawing, it should first be considered that there is applied to the input terminals 20 an electrical direct current signal which may be proportional to the magnitude of some variable. This electrical signal is to be appropriately indicated by the movement of the indicator arm 17 over a suitable indicating scale or recorder chart, as shown. The input signal on the terminals 20 will be applied to the electric force coil 21 and the force coil will tend to move the pivoted member 22. In the case of an increased D.C. input signal, the coil 21 will move arm 22 in counter clockwise direction. The movement of the member 22 will be detected by the electrical detector 23 and the oscillator-amplifier 24 will have an output signal indicative of the amount of motion of the member 22.

The power amplifier 25 will sense the input signal from the oscillator-amplifier 24 and the output current from the transistor 30 of the amplifier 25 will produce a current flow through the drive coil 14 of the torque motor 10 which is proportional to the motion of the member 22. The application of current to the driving coil 14 will cause the torque motor 10 to move the indicator arm 17 in an upward or clockwise direction. Movement of the indicator arm 17 in an upward direction against the force of the biasing spring 19 will cause the spring 19 to exert a balancing force on the member 22 and this force will overcome the input force caused by the current flowing through the force coil 21 so as to balance the same. The amount that the indicator arm 17 moves is a direct function of the amount of force necessary to balance the member 22. This movement is directly proportional to the amount of current flowing in the input terminals 20.

As there is a certain amount of mechanical lag in the torque motor 10 and in the other mechanical components of the apparatus, this lag may introduce undesirable instability in the overall servo control loop. In addition, there are electrical lags in the circuit which can further introduce undesirable phase shifts in the control circuit which can cause the circuit to oscillate. To overcome these undesirable effects, the damping circuit 35 has been included. The damping characteristics of this damping circuit 35 are of such a magnitude that the lag introduced thereby is considerably greater than any of the mechanical lags or electrical lags which have been mentioned above.

Considering the power amplifier 25 in greater detail, it will be seen that the output of the oscillator-amplifier 24 is coupled to the input of the transistor 30 by the damping circuit 35. Thus, a circuit may be traced from output lead 45 through resistor 39, condenser 41, resistor 42, and lead 46 back to the oscillator-amplifier 24. The current flowing in this circuit will cause an appropriate change in the output current of the transistor 30 and this output circuit may be traced from the positive terminal of the battery 34 through the lead 27, drive coil 14, lead 26, emitter 32, and collector 33 back to the negative terminal of the battery 34. It should be noted that the base-emitter circuit of the transistor 30 is effectively in parallel with the resistor 42 and the condenser 41. In view of this parallel relationship in the circuit, the damping characteristics of the circuit will vary with variations in the impedance of the base-emitter circuit. It has been found that the base-emitter circuit of a transistor is non-linear and consequently, the impedance characteristic of that part of the transistor will be a function of the direction of the applied current. For this reason, the functioning of the resistor 39, condenser 41, and resistor 42 alone on the input of the transistor 30 will be effective to cause torque motor 10 to drive in one direction faster than it will drive in the opposite direction.

This non-linearity in the rate of drive in the indicator arm 17 is overcome in the present circuit by the incorporation of the diode 37. The diode 37 is connected in series with the resistor 38 and the two elements are adjusted in such a manner that the impedance establishing the time constant of the circuit which includes the condenser 41 will be the same whether the current input from the oscillator-amplifier 24 is increasing or is decreasing.

The speed at which the indicator arm 17 moves may be varied by changing the time constants of the damping circuit 35. Thus, the magnitudes of the resistors 38 and 39 may be changed and the condenser 36 may likewise be changed or even eliminated depending upon the time constant desired for full scale travel of the indicator arm 17. A further time constant change may be made by changing the magnitude of condenser 41. With these components present in the circuit 35, it is possible to provide variable speed positioning of the arm 17 and still retain the desired circuit stability by introducing sufficient lag in the damping network 35 to keep the complete loop stable.

While, in accordance with the provisions of the statutes, there have been illustrated and described the best form of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. A reversible torque motor drive circuit comprising a transistor having a pair of direct current input terminals and a pair of output terminals, a torque motor drive coil connected in series with said output terminals, and an asymetrical conducting device connected in series with said input terminals to produce a current flow between said output terminals which is operable to effect movement of said torque motor with uniform speed in either direction of operation.

2. Electrical apparatus for controlling the operation of a reversible torque motor comprising a transistor having a pair of input terminals and a pair of output terminals, electrical energizing means connected in series with said output terminals and a drive coil on said torque motor, a direct current signal source connected to said input terminals to effect variations in the current flowing in said drive coil of said torque motor, and a non-linear impedance circuit connected to said input terminals to effect a linearity of output torque on said torque motor.

3. Electrical apparatus for controlling the operation of a reversible torque motor comprising a transistor having a pair of input terminals and a pair of output terminals, electrical energizing means connected in series with said output terminals and a drive coil on said torque motor, a direct current signal source connected to said input terminals to effect variations in the current flowing in said drive coil of said torque motor, a condenser connected across said input terminals, and a non-linear impedance circuit including a diode connected to said input terminals to effect a linearity of the rate of change of position of said torque motor.

4. Electrical apparatus for controlling the operation of a reversible torque motor comprising a transistor having a pair of input terminals and a pair of output terminals, electrical energizing means connected in series with said output terminals and a drive coil on said torque motor, a direct current signal source connected to said input terminals to effect variations in the current flowing in the said drive coil of said torque motor, and a non-linear impedance circuit connected to said input terminals to effect a linearity of rate of change of output motion of said torque motor, said non-linear impedance circuit comprising a diode and a resistor connected in parallel with each other and in series with one of said input terminals.

5. In combination, an electrical torque motor having a drive coil for effecting motion of said motor in a first direction and a return spring connected to said motor to effect motion of said motor in a second direction, a power control circuit for said drive coil, said power control circuit comprising electrical energizing means and a regulable impedance circuit for varying the current flowing from said energizing means through said drive coil, a pair of input terminals connected to said regulable impedance circuit, and a non-linear electrical circuit connected to said input terminals to effect a uniform rate of change of motion of said torque motor when moving in said first or said second direction.

6. In combination, an electrical torque motor having a drive coil for effecting motion of said motor in a first direction and a return spring connected to said motor to effect motion of said motor in a second direction, a power control circuit for said drive coil, said power control circuit comprising an electrical energizing means and a regulable impedance circuit for varying the current flowing from said energizing means through said drive coil, a pair of input terminals connected to said regulable impedance circuit, and a non-linear electrical circuit connected to said input terminals to effect a uniform rate of change of motion of said torque motor when moving in said first or said second direction, said non-linear circuit comprising a diode, a first resistor connected in series therewith, and a second resistor connected in parallel with the series connected diode and first resistor.

7. In combination, an electrical torque motor having a drive coil for effecting motion of said motor in a first direction and a bias spring connected to said motor to effect motion of said motor in a second direction, a power control circuit for said drive coil, said power control circuit comprising a source of power and a regulable impedance circuit for varying the current flowing from said source through said drive coil, a pair of input terminals connected to said regulable impedance circuit, and a non-linear electrical circuit connected to said input terminals to effect a uniform rate of change of motion of said torque motor when moving in said first or said second direction, said non-linear circuit comprising a diode, a first resistor connected in series with said diode, a second resistor connected in parallel with said series connected diode and first resistor, and a condenser connected in parallel with said second resistor.

8. Apparatus as defined in claim 7 wherein said power control circuit includes a transistor having a base, emitter, and a collector, means connecting said emitter and collector to said drive coil, and means connecting said non-linear electrical circuit to said base.

9. A current to motion transducer comprising an input force coil, said coil having a pair of input terminals and being adapted to effect displacement of a member upon a current being applied thereto, a member motion detecting means, a power amplifier connected to said motion detecting means and adapted to produce an output current variation which is a function of the input current applied to said input terminals, a torque motor having a drive coil, means connecting said drive coil to said power amplifier, a resilient member connected between said torque motor and said force coil to produce a force on said member to balance the force originating from said force coil, said resilient member acting on said torque motor to provide a bias to move said motor in a direction opposite the direction caused by energization of said drive coil, and a circuit means connected to said power amplifier to effect uniform energization of said torque motor so that said motor will move at a uniform speed in either of its directions of operation.

10. A current to motion transducer comprising an input force coil, said coil having a pair of input terminals and being adapted to effect displacement of a member upon a current being applied thereto, a member motion detecting means, a power amplifier connected to said motion detecting means and adapted to produce an output current variation which is a function of the input current applied to said input terminals, a torque motor having a drive coil, means connecting said drive coil to said power amplifier, a resilient member connected between said torque motor and said force coil to produce a force on said member to balance the force originating from said force coil, said resilient member acting on said torque motor to provide a bias to move said motor in a direction opposite the direction caused by energization of said drive coil, and a circuit means connected to said power amplifier to effect uniform energization of said torque motor so that said motor will move at a uniform speed in either of its directions of operation, said circuit means comprising a diode connected in parallel with a portion of an electrical damping circuit.

11. A current to motion transducer comprising an input force coil, said coil having a pair of input terminals and being adapted to effect displacement of a member upon a current being applied thereto, a member motion detecting means, a power amplifier including a transistor connected to said motion detecting means and adapted to produce an output current variation which is a function of the input current applied to said input terminals, a torque motor having a drive coil, means connecting said drive coil to said transistor of said power amplifier, a resilient member connected between said torque motor and said force coil to produce a force on said member to balance the force originating from said force coil, said resilient member acting on said torque motor to provide a bias to move said motor in a direction opposite the direction caused by energization of said drive coil, and a circuit means connected to the input of said transistor to effect uniform energization of said torque motor so that said motor will move at a uniform speed in either of its directions of operation, said circuit means comprising a diode and a resistor connected in series.

References Cited in the file of this patent

UNITED STATES PATENTS

| | | |
|---|---|---|
| 2,455,364 | Hays | Dec. 7, 1948 |
| 2,475,132 | Ergen | July 5, 1949 |
| 2,475,576 | Wild et al. | July 5, 1949 |
| 2,574,690 | Clark | Nov. 13, 1951 |
| 2,602,660 | Shannon | July 8, 1952 |
| 2,780,101 | Kinkel | Feb. 5, 1957 |